United States Patent [19]

Tsuchiya et al.

[11] 4,307,008

[45] Dec. 22, 1981

[54] ALCOHOLIC VARNISHES

[75] Inventors: Shozo Tsuchiya, Tokyo; Hideo Hayashi, Yokohama, both of Japan

[73] Assignee: Nippon Oil Co., Ltd., Tokyo, Japan

[21] Appl. No.: 885,703

[22] Filed: Mar. 13, 1978

[30] Foreign Application Priority Data

Mar. 25, 1977 [JP] Japan .................................. 52-32044

[51] Int. Cl.³ .............................................. C08K 5/05
[52] U.S. Cl. ................................. 260/33.4 R; 526/283
[58] Field of Search ....................... 526/283, 308, 272; 260/33.4 R

[56] References Cited

U.S. PATENT DOCUMENTS

| | | | |
|---|---|---|---|
| 2,645,622 | 7/1953 | Praeg | 260/33.4 R |
| 2,671,070 | 3/1954 | Knapp | 526/283 |
| 3,412,053 | 11/1968 | Pugliese | 260/33.4 R |
| 3,890,285 | 6/1975 | Sumita | 526/283 |
| 3,957,736 | 5/1976 | Tsuchiya | 526/283 |
| 4,037,038 | 7/1977 | Tsuchiya | 526/283 |
| 4,064,199 | 12/1977 | Nishikawa | 526/283 |

*Primary Examiner*—Paul R. Michl
*Attorney, Agent, or Firm*—Jordan and Hamburg

[57] ABSTRACT

An alcoholic varnish comprising an alcoholic solution of a hydroxyl group-containing copolymer resin of cyclopentadiene, dicyclopentadiene or an alkyl-substituted derivative thereof and a compound, such as allyl alcohol, having at least one double bond and at least one hydroxyl group in the molecule. In one embodiment, this invention relates to an alcoholic varnish comprising an alcoholic solution of said hydroxyl group-containing resin and at least one known alcohol soluble resin such as maleinated rosin or alkyd resin.

3 Claims, No Drawings

ALCOHOLIC VARNISHES

This invention relates to alcoholic varnishes and more particularly it relates to alcoholic varnishes prepared by reacting (A) cyclopentadiene, dicyclopentadiene and/or an alkyl-substituted product thereof with (B) a compound having a reactive double bond and a hydroxyl group in the molecule to produce a resin containing hydroxyl groups and then dissolving the thus produced resin in an alcohol. The alcoholic varnishes of this invention may be used as a coating composition or vehicle for printing inks, paints or the like and are useful as a varnish particularly for printing inks.

There have heretofore been proposed printing inks containing an alcohol soluble resin dissolved in an alcohol as the main solvent since they are advantageous from the view-point of environmental pollution counter-measures and they may be set rapidly and operated safely for example. Such printing inks which have been known, include those containing a modified rosin obtained by addition reaction of rosin with maleic or fumaric acid, those containing a natural high molecular weight substance such as shellac and those containing an alkyd or acryl resin having a large amount of hydroxyl and carboxyl groups. Particularly, alcoholic vehicles wherein maleinated rosin is used are widely used for flexographic or gravure printing inks. However, it is expected that rosin will rise in price from now on since rosin resources tend to be lacking. In addition, it is now difficult to supply rosin always in a fixed quality since rosin is a mixture of natural resin acids and varies in quality depending on rosin-producing districts.

On the other hand, alkyd and acryl resins containing a large amount of hydroxyl and carboxyl groups, which are synthetic high molecular weight resins, have partly been used as a vehicle for conventional alcoholic or aqueous links; however, such conventional inks are disadvantageous in that when printed on a substrate will not give prints having satisfactory gloss, water resistance, wear resistance and like properties and will not satisfactorily adhere to films or metal surfaces since only varnishes containing said resins in low concentrations may be prepared because of their high molecular weight.

An object of this invention is to provide alcoholic varnishes which may be used in the preparation of inks eliminating various disadvantages of the aforesaid conventional alcoholic inks, the alcoholic varnishes comprising an alcoholic solution of a resin containing hydroxyl groups, prepared by the reaction of (A) at least one compound selected from the group consisting of cyclopentadiene, dicyclopentadiene and alkyl-substituted derivatives thereof with (B) a compound having at least one double bond and at least one hydroxyl group in the molecule.

This object may be achieved by reacting at 150°–300° C. (A) at least one of cyclopentadiene, dicyclopentadiene and alkyl-substituted products thereof with (B) a compound containing both at least one double bond and at least one hydroxyl group in the molecule to produce a resin and then dissolving the thus produced resin in a solvent mainly containing an alcohol to obtain a resin varnish.

The component (A) used herein includes cyclopentadiene, dicyclopentadiene, methylcyclopentadiene, cyclopentadiene-methylcyclopentadiene codimer, tricyclopentadiene or a mixture thereof. These components may preferably be used industrially.

It is not always necessary that the component (A) (cyclopentadiene, dicyclopentadiene or an alkyl-substituted product thereof) are high in purity, but it is preferable that the component (A) is of at least 80 wt.% purity. For example, the component (A) may be one which is prepared by thermally dimerizing cyclopentadiene, methylcyclopentadiene, etc. contained in a $C_5$ fraction obtained as a by-product by the thermocracking of naphtha or the like at a high temperature to produce a mixture of dicyclopentadiene, cyclopentadiene-methylcyclopentdiene codimer, cyclopentadiene-isoprene codimer, cyclopentadiene-piperylene codimer and the like, and then distilling the thus-heat treated $C_5$ fraction to remove therefrom the greater part of $C_5$ components such as $C_5$ olefins and $C_5$ paraffins thereby obtaining a concentrated fraction as the component (A).

The component (B) which is a compound having at least one reactive double bond and at least one hydroxyl group in the molecule, include (meth)allyl alcohol, 2-hydroxyethyl (meth)acrylate, 2-hydroxylpropyl (meth)acrylate and 1,4-butenediol or a mixture thereof. These compounds have about 3 to about 20 carbon atoms.

The term "(meth)acrylate" used herein is intended to mean "acrylate and methacrylate".

The copolymer resin of the component (A) (such as cyclopentadiene) and the component (B) (such as allyl alcohol) according to this invention may be obtained by reacting the components (A) and (B) at 150°–350° C. in the presence of a radical initiator or in the absence of any catalyst and, if desired, in the presence of a solvent for 30 minutes–15 hours. The molar ratio between the components (A) and (B) used in said reaction may vary from 30:70 to 95:5, preferably from 40:60 to 80:20. The aforesaid copolymer resins according to this invention are normally solid at ambient temperature, and they may be obtained with a predetermined softening point by selectively using reaction conditions such as the reaction time and reaction temperature during the production thereof depending on the purpose for which they are to be used. The softening point of the copolymer resins may preferably be in the range of 50°–200° C.

In the production of the copolymer resins, there may be further used, as a third component (C), (1) a polymerizable aromatic compound such as styrene or indene, (2) a polymerizable polar compound such as acrylic acid, maleic acid, maleic anhydride, an acrylic acid ester or vinyl acetate or (3) a phenolic compound in an amount not exceeding the amount of the component (A) used.

If necessary, the copolymer resins may be reacted with a polycarboxylic acid (such as maleic acid, phthalic acid, tetrahydrophthalic acid, trimellitic acid, pyromellitic acid, or 5-norbornene-2,3-dicarboxylic acid) or anhydride thereof with a resol type phenol resin at a temperature of 100°–200° C. for 10 minutes–10 hours to produce an alcoholic varnish of this invention. The reaction may be effected at 50°–150° C. for 10 minutes–10 hours in the presence of an acid such as p-toluenesulfonic acid.

The copolymer resins may also be incorporated or reacted with heretofore known alcohol-soluble resins such as maleinated rosin, shellac, acrylic resins, phenol resins, polyamide resins, alkyd resins and modified petroleum resins to produce alcoholic varnishes; in this case, a mixture of water and an alcohol is of course effective for use as a solvent for varnishes, and the addition of an amine or alkali in a small amount is effective for increasing the solubility. Such reaction with the known alcohol-soluble resins may be effected at 100°-200° C. for 10 minutes-10 hours, and said known resins may be used in any amounts, preferably in amounts of up to about 30% by weight of the copolymer resin mentioned above.

The solvents which may be used in the preparation of an alcoholic varnish of this invention may include monohydric alcohols such as methanol, ethanol, isopropanol and butanol as well as polyhydric alcohols such as ethylene glycol, propylene glycol, polyethylene glycol and glycerine. Mixtures of at least two of these monohydric and polyhydric alcohols may also be used as the solvent.

The alcoholic varnishes of this invention are useful in the preparation of printing inks, paints or the like and are particularly effective when used in the preparation of printing inks. More particularly, the alcoholic varnishes may be kneaded with a pigment, wear resistance improver (such as a wax compound), anti-foam agent and the like to produce a flexographic ink, gravure ink, glycol ink or the like. The thus-produced inks when applied will give printed matter having far excellent gloss, water resistance and like properties as compared with conventional ones containing a conventional vehicle such as a maleic resin.

In addition, the copolymer resins according to this invention may be hydrogenated by the use of a heretofore known method and dissolved in an alcohol thereby to prepare an alcoholic varnish having a light color.

This invention will be better understood by the following examples wherein all parts and percentages are by weight unless otherwise specified.

EXAMPLE 1

One hundred and thirty-two (132) grams of dicyclopentadiene of 97% purity, 58 g of allyl alcohol and 110 g of commercially available xylenes were charged into an autoclave provided with an agitator, and the resulting mixture was reacted at 260° C. for 5 hours. After completion of the reaction, the autoclave was cooled and then the reaction mixture therein distilled to remove therefrom the unreacted monomer, low polymers and the xylenes thereby obtaining 152 g of a resin (I). The resin (I) so obtained had a softening point of 93° C. and an OH group content of 0.40 g equivalent/100 g of resin. 35 parts of the resin (I) were dissolved in a mixture of 40 parts of isopropanol (IPA) and 25 parts of ethanol to obtain a varnish (A). Using this varnish, a flexographic ink of the following composition was prepared.

| Ink (A) | |
| --- | --- |
| Varnish (A) | 70 Parts |
| Fineness Red 2B (Red pigment produced by Toyo Ink Mfg. Co. Ltd.) | 10 Parts |
| Anti-foam agent | 3 Parts |
| Wax compound | 2 Parts |
| IPA (isoproanol) | 5 Parts |
| Ethyl acetate | 10 Parts |

Comparative Example 1

Thirty (30) parts of commercially available rosin-modified maleic resin were dissolved in a mixture of 30 parts of IPA (isopropanol), 20 parts of ethanol and 20 parts of ethyl acetate to prepare a varnish (B). Using the varnish (B) so prepared, a flexographic ink was prepared in accordance with the following formulation.

| Ink (B) | |
| --- | --- |
| Varnish B) | 70 Parts |
| Fineness Red 2B | 10 Parts |
| Anti-foam agent | 3 Parts |
| Wax compound | 2 Parts |
| IPA | 10 Parts |
| Ethyl acetate | 5 Parts |

The aforesaid inks (A) and (B) were printed on liner (or liner board) by the use of rubber rollers, respectively, and the inks so printed were evaluated for their drying property, rub resistance and gloss. The results are shown in Table 1.

TABLE 1

| | Drying property | Rub resistance in dry state | Rub resistance in wet state | Gloss |
| --- | --- | --- | --- | --- |
| Ink (A) | 5 sec. | Satisfactory | Satisfactory | Satisfactory |
| Ink (B) | 5 sec. | Satisfactory | Unsatisfactory | Unsatisfactory |

Table 1 clearly indicates that the ink (A) in which the alcoholic varnish of this invention was used, was excellent in wet-state rub resistance and gloss as compared with the ink (B) in which the maleic resin was used.

EXAMPLE 2

Eighty-four (84) grams of dicyclopentadiene of 95% purity, 56 g of cis-2-butene-1,4-diol and 60 g of commercially available xylenes were introduced into an autoclave provided with an agitator, and the resulting mixture was reacted at 260° C. for 5 hours to obtain a reaction mixture. The reaction mixture so obtained was distilled thereby obtaining 97 g of a resin (II) having a softening point of 115° C. and a OH group content of 0.50 g equivalent/100 g of resin. 30 parts of the resin (II) were dissolved in a mixture of 40 parts of IPA, 25 parts of ethanol and 5 parts of ethyl acetate to prepare a varnish (C). Using the varnish (C), a gravure ink was prepared in accordance with the following formulation:

| Ink (C) | |
| --- | --- |
| Varnish (C) | 73 Parts |
| Fineness Red 2B | 16 Parts |
| Anti-foam agent | 1 Part |
| IPA | 10 Parts |

Comparative Example 2

Thirty-five (35) parts of commercially available rosin-modified resin were dissolved in a mixture of 40 parts of IPA, 10 parts of ethanol and 15 parts of ethyl acetate to prepare a varnish (D). Using the varnish (D), there was obtained an ink (D) having the following composition:

TABLE

| Ink (D) | |
| --- | --- |
| Varnish (D) | 70 parts |
| Fineness Red 2B | 16 Parts |
| Anti-foam agent | 1 Part |
| IPA | 13 Parts |

The aforesaid gravure inks (C) and (D) were printed on art paper by the use of a gravure printer provided with a hot gas drier, respectively, and the inks so printed were tested for their properties. The results are shown in Table 2.

TABLE 2

|  | Gloss | Blocking | Wet-state wear resistance |
|---|---|---|---|
| Ink (C) | Satisfactory | None | Satisfactory |
| Ink (D) | Unsatisfactory | None | Unsatisfactory |

From Table 2 it is apparent that the gravure ink (C) using therein the alcoholic varnish of this invention had excellent properties as compared with the ink (D) using therein the commercially available rosin-modified maleic resin.

What is claimed is:

1. An alcoholic varnish comprising a solution in an alcohol of a resin containing hydroxyl groups, prepared by reacting (A) at least one compound selected from the group consisting of cyclopentadiene, dicyclopentadiene and alkyl-substituted derivatives thereof with (B) a compound having at least one double bond and at least one hydroxyl group in the molecule in the presence of at least one other polymerizable compound in an amount not exceeding the amount of the compound (A) used, said at least one other polymerizable compound being selected from the group consisting of styrene, indene, vinyl acetate and phenolic compounds.

2. An alcoholic varnish comprising a solution in an alcohol of a resin containing hydroxyl groups, prepared by reacting (A) at least one compound selected from the group consisting of cyclopentadiene, dicyclopentadiene and alkyl-substituted derivatives thereof with (B) a compound having at least one double bond and at least one hydroxyl group in the molecule, said hydroxyl group-containing resin being prepared by reacting with a resol type phenol resin at an elevated temperature.

3. An alcoholic varnish comprising a solution in an alcohol of a resin containing hydroxyl groups, prepared by reacting (A) at least one compound selected from the group consisting of cyclopentadiene, dicyclopentadiene and alkyl-substituted derivatives thereof with (B) a compound having at least one double bond at least one hydroxyl group in the molecule, said hydroxyl group-containing resin being prepared by mixing or reacting with at least one alcohol soluble resin selected from the group consisting of maleinated rosin, shellac, phenolic resins, polyamide resins, alkyd resins and modified petroleum resins.

* * * * *